(12) United States Patent
Reitmann et al.

(10) Patent No.: US 7,548,533 B2
(45) Date of Patent: Jun. 16, 2009

(54) COMMUNICATION SYSTEM FOR AN AIRCRAFT

(75) Inventors: Joerg Reitmann, Harsefeld (DE); Jan Mueller, Hamburg (DE); Robert Kebel, Stade Hagen (DE); Axel Koenig, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 67 days.

(21) Appl. No.: 11/247,835

(22) Filed: Oct. 11, 2005

(65) Prior Publication Data

US 2006/0088001 A1    Apr. 27, 2006

Related U.S. Application Data

(60) Provisional application No. 60/618,129, filed on Oct. 13, 2004.

(30) Foreign Application Priority Data

Oct. 13, 2004  (DE) ........................ 10 2004 049 895

(51) Int. Cl.
*H04W 4/00* (2009.01)
*H04B 1/00* (2006.01)
(52) U.S. Cl. .................... 370/338; 455/41.2; 455/431
(58) Field of Classification Search ................ 370/328, 370/334, 338; 455/431, 41.2, 41.3
See application file for complete search history.

(56) References Cited

U.S. PATENT DOCUMENTS

| 5,742,911 | A * | 4/1998 | Dumbrill et al. ......... 455/562.1 |
| 2004/0142658 | A1 | 7/2004 | McKenna et al. | |
| 2004/0180653 | A1 * | 9/2004 | Royalty ................... 455/431 |
| 2005/0026609 | A1 * | 2/2005 | Brinkley et al. ............ 455/431 |

FOREIGN PATENT DOCUMENTS

| EP | 1 096 699 A2 | 5/2001 |
| WO | WO 02/080487 A2 | 10/2002 |
| WO | WO 02/101995 A1 | 12/2002 |
| WO | WO 02/103932 A1 | 12/2002 |
| WO | WO 2004/073199 A1 | 8/2004 |

OTHER PUBLICATIONS

Yann-Hang Lee et al, An integrated scheduling mechanism for fault-tolerant modular avionics systems, Aerospace Conference, 1998 IEEE Snowmass at Aspen, Co., USA Mar. 21-28, 1998, New York, NY, USA, IEEE, US, Bd. 4, Mar. 21, 1998, Seiten 21-29, XP010286915, ISBN: 0-7803-4311-5.

* cited by examiner

*Primary Examiner*—Lee Nguyen
(74) *Attorney, Agent, or Firm*—Christopher Paradies; Fowler White Boggs P.A.

(57) ABSTRACT

An interface device for a communication network comprises a plurality of first communication nodes and a plurality of second communication nodes, wherein the interface device comprises a switching unit and a transmit-/receive aerial. The switching unit is capable of being coupled, so as to be able to communicate, to each of the first communication nodes and to each of the second communication nodes, and is configurable for transmitting a communication message between one of the first communication nodes and a second communication node, which may be unambiguously allocated to said first communication node. The switching unit may be coupled to the transmit-/receive aerial for wireless communication with each of the second communication nodes by way of the transmit-/receive aerial that may be shared for communicating with each of the second communication nodes.

14 Claims, 2 Drawing Sheets

COMMUNICATION SYSTEM FOR AN AIRCRAFT

RELATED APPLICATIONS

This application claims the benefit of the filing date of U.S. Provisional Patent Application No. 60/618,129 filed Oct. 13, 2004, and of German Patent Application No. 10 2004 049 895.4 filed Oct. 13, 2004 the disclosures of which are hereby incorporated herein by reference.

FIELD OF THE INVENTION

The field is systems for transferring data and signals between and among components of an aircraft.

BACKGROUND

In modern passenger aircraft the implementation of a plurality of electronic devices and applications to increase passenger comfort forms part of the standard expected by passengers. Furthermore, aircraft safety aspects, which are becoming ever more important, lead to electronic monitoring systems based on electronic devices also being implemented in aircraft.

To this effect, according to the state of the art, the various devices are provided so as to be distributed over the aircraft and activated by radio by way of separate control devices. The state of the art thus frequently uses the principle of conventional distribution for wireless data transmission of such a system in an aircraft. In this arrangement each radio system comprises separate transmitter devices and receiver devices, each with their own aerials, distributed over the interior of the aircraft.

In other words, each such electronic system in an aircraft comprises a control device and a receiver device, which communicate with each other with the use of an aerial that is separate in each control device, wherein each aerial only makes it possible for any given control device to communicate with the receiver devices allocated to this one control device.

The communication architecture known from the state of the art is associated with a disadvantage in that a large number of aerials have to be installed, which results in considerable expenditure. Furthermore, all wireless systems must comply with regulations relating to electromagnetic compatibility (EMC), i.e. they must meet protection specifications required for devices that might cause electromagnetic interference. Furthermore, the locations where the individual aerials are placed strongly depends on the cabin layout (for example galleys, toilets etc.). If a system is to be modified, expanded or replaced, or if such a system is to be serviced, the entire cabin is affected by this, which results in very considerable service expenditure. Particularly in the case of passenger aircraft, which are often operated in a winter layout and a summer layout, i.e. which undergo a layout change at least twice a year, this results in significant costs. Furthermore, implementation of new radio systems with the communication architecture according to the state of the art require considerable expenditure relating to cabling as well as to space and weight.

SUMMARY

There is a longstanding and unresolved need to provide a network architecture for networked devices in an aircraft such that flexibility is increased and the costs associated with implementing and updating system components is reduced.

In one example of the present invention, a wireless networking system couples components together, such as control and receive devices, for example. The examples disclosed provide for systems that are capable of rapid and flexible reconfiguration of the communication system in an aircraft.

In one example, an interface device for a communication network comprising a plurality of first communication nodes and a plurality of second communication nodes comprises a switching unit and a transmit-/receive aerial. The switching unit may be coupled such that the unit is capable of communicating to each of the first communication nodes and to each of the second communication nodes and may be configured for transmitting a communication message between one of the first communication nodes and a second communication node which may be unambiguously allocated to the first communication node. The switching unit may be coupled to the transmit-/receive aerial for wireless communication with each of the second communication nodes by way of the transmit-/receive aerial that is shared for communicating with each of the second communication nodes.

For example, a communication network comprises an interface device with the above-described characteristics, a plurality of first communication nodes, and a plurality of second communication nodes. One of the second communication nodes may be unambiguously allocated to each of the first communication nodes. The switching unit is configured such that the switching unit is capable of communicating to each of the first communication nodes and to each of the second communication nodes, and is equipped for transmitting a communication message between one of the first communication nodes and the second communication node, unambiguously allocated to said first communication node, by way of the transmit-/receive aerial that is shared for communicating with each of the two communication nodes.

In another example, an aircraft comprises an interface device with the above-described characteristics, or a communication network with the above-described characteristics.

In another example, a system for operating an interface for a communication network comprises selecting a plurality of first communication nodes and a plurality of second communication nodes, providing a switching unit, coupling the switching unit such that the switching unit is capable of communicating to each of the first communication nodes and to each of the second communication nodes, and equipping the system for transmitting the communication message between one of the first communication nodes and a second communication node, which is unambiguously allocated to said first communication node. The system may further comprise coupling the switching unit to the transmit-/receive aerial for wireless communication with each of the second communication nodes by way of the transmit-/receive aerial that is shared to communicate with each of the second communication nodes.

One advantage of the present invention is that is may be used in an aircraft environment and is compatible with signal security and interference requirements.

In one example, the system provides an interface between first communication nodes (for example control devices for receiving devices) and second communication nodes (for example receive devices that may be controllable by the control devices), wherein a shared transmit-/receive aerial may be used that for all pairs of control/receive devices may comprise a first communication node and an associated second communication node. Such a central transmit-/receive aerial is capable of a high degree of flexibility, data exchange between any one of the first communication nodes and a second communication node that has been unambiguously allocated to a specific first communication node. One advantage is that a system may no longer be necessary to separately provide insulated aerials, which according to the state of the art are necessary for each pair of a first communication node and a second communication node. The switching unit, which may effect coupling of a first communication node to a respective second communication node with the use of the shared aerial for transmitting and receiving electromagnetic signals, may provide a central mixer node in the network, which mixer node may control the communication messages (for example control signals or data signals) between a first communication node and a second communication node, and which mixer node may further allocate bandwidth resources and may make do with a single transmit-/receive aerial. The plurality of first communication nodes may for example be provided centrally at a particular position in an aircraft, and may be coupled to the switching unit by wire. By way of a concrete example, the first communication nodes and the interface device may be implemented as a local (sub-)network that may be centrally administered, maintained and operated from a particular position.

For example, the various first communication nodes may be electronic slide-in devices for sliding into an electronics rack so that the individual first communication nodes may be expanded or altered as desired, without this having ramifications for the entire cabin of an aircraft. By a central connector (namely the interface device with the switching unit and the shared transmit-/receive aerial) a central control system is created by way of which the second communication nodes provided throughout the aircraft may communicate wirelessly via the shared aerial. The first communication nodes may be preferably located near the central connector.

To implement a new device or a new functionality in an aircraft, for example a mobile radio telephony device, a corresponding control unit as a first communication node may be coupled to the switching unit, and the associated receiver device may be implemented at any desired position in the aircraft (for example on the passenger seats). By the firmly installed shared transmit-/receive aerial, provided on a shared-basis in the switching unit, for communicating with all second communication nodes, communication may then take place between the control device and the receiver device, switched by the interface device.

Thus, a universal central distribution system of multiple wireless services, in other words a universal wireless backbone system, in particular for an aircraft, may be created. For implementing various radio-based systems in an aircraft cabin, it is an advantage that radio services may be implemented in an aircraft so that they may be universal, scalable and useable now and in the future. Additional advantages are that it is easy servicing, great variability, good scalability and independent of particular radio protocols so that manifold present and future radio services may be supplied to the interior region of an aircraft by way of a central feed-in point, wherein simultaneously available limited channel resources may be optimally configured.

Electronic devices may be integrated in the network as first and second communication nodes and may include for example a WLAN (wireless local area network), a mobile radio device that makes possible mobile radio calls in the aircraft (for example based on GMS technology or UMTS technology), an onboard network, a cabin monitoring system or an in-flight cabin entertainment (IFE) system for passengers.

One advantage is that the system may provide a shared aerial structure for several electronic devices which communicate with each other by way of this central aerial structure.

The aerial may be provided as a broadband aerial so that many radio signals may be transmitted by way of a single aerial. The fact that the transmit-/receive aerial is shared by the various systems is another advantage, allowing the aerial to be installed in a central location. Even if the system is expanded or otherwise changed, the centralized location of the aerial allows the same configuration to be used and expanded. Thus only a single local aerial feed electronics arrangement may be necessary in a single location of the network, wherein said aerial feed electronics arrangement may be provided so as to be exchangeable so that the service expenditure may be particularly modest. Configurable connection points (for example plug-in places of an electronics rack) may be provided at the interface device, into which connection points the first communication nodes may be plugged in and out as desired and in a variable manner. Expansion of a system thus may only require plugging an electronics module into a free plug-in place at the interface device and the installation of a receive device at any other location in the aircraft, wherein communication between the electronics and the receive device may take place by way of an aerial of the receive device and a central aerial.

The shared transmit-/receive aerial may be divided into a transmit aerial and a separate receive aerial; a factor which may be important in particular to avoid collision in a wireless local area network (WLAN) application. However, in general, i.e. in relation to many other applications, for example mobile telephony or a camera monitoring system, a shared transmit-/receive aerial which has both a transmit functionality and a receive functionality may be sufficient.

Another advantage is that the system may have receive devices being arranged so as to be distributed throughout an aircraft, such as a freight coding system in a cargo hold, an in-flight cabin entertainment system in a passenger compartment, a monitoring system in the cockpit, and other distributed systems. At a central position, the interface device including the first communication nodes may be implemented; the interface device may provide the master control system for the individual distributed systems.

Wireless communication between the shared transmit-/receive aerial of the interface device and distributed transmit-/receive aerials of the second communication nodes preferably may take place in the high-frequency range, for example within the context of a GSM 400, GSM 850, GSM 900, GSM 1800, GSM 1900, CDMA, UMTS or WLAN (according to an IEEE 802.11 standard) system.

One or several second communication nodes can be allocated to a first communication node.

Examples of an interface device are described herein. The device may comprise a part of a communication network, an aircraft, a method for operating an interface for a communication network, and a use for an interface device or a communication network in an aircraft.

The switching unit may be equipped for wired or wireless communication with each of the first communication nodes. Using conventional wiring, the first communication nodes may be locally coupled to the switching unit so that there is no need for a separate radio connection for this purpose.

The switching unit may comprise a plurality of transmit connections and may comprise a plurality of receive connections. In each case one of the transmit connections and one of the receive connections may be coupled to one of the first communication nodes. Furthermore, each of the transmit connectors may be equipped for transmitting a communication message to be sent by one of the first communication nodes; and each of the receive connections may be equipped for transmitting a communication message to be sent to one of the first communication nodes. Separating the transmit path from the receive path may favour collision-free transmission even of large quantities of data between the first and second communication nodes.

The switching unit may comprise a first signal processing unit, which is coupled to the plurality of transmit connections and which is equipped for processing signals to be sent by the transmit-/receive aerial, which signals may be conveyable to the first signal processing unit by at least one of the transmit connections. By way of a concrete example, the first signal processing unit may be a type of router which may arrange, classify and pre-processe the signals transmitted by way of the transmit connections in order to provide said signals to the aerial for transmission to the associated second communication node.

Furthermore, the switching unit may comprise a second signal processing unit, which is coupled to the plurality of receive connections and which is equipped for processing signals received by means of the transmit-/receive aerial, which signals are conveyable to at least one receive connection by the second signal processing unit. The second signal processing unit may process signals received by the aerial and may convey these signals to the corresponding first communication nodes, wherein the second signal processing unit may also carry out preliminary processing of the signals.

The transmit-/receive aerial of the interface device may be divided into a transmit aerial for wireless transmission of signals to the second communication nodes, and into a receive aerial, provided separately of the transmit aerial, for the wireless receiving of signals from the second communication nodes. Splitting the transmit-/receive aerial into a separate receive aerial and a separate transmit aerial may ensure collision-free transmission even of large data quantities and may be important in setting up a WLAN system A transmit-/receive aerial may thus be split into a transmit sub-aerial (TX) and a receive sub-aerial (RX).

The interface device may comprise a plurality of transmit-/receive aerials, each of which is provided for communication with each of the second communication nodes in a shared arrangement and at a central location. It may be decisive that even if a plurality of transmit-/receive aerials are provided, they are provided in a shared arrangement and at a central location for all first and second communication nodes, and that there is no need to provide a transmit-/receive aerial specially for this purpose for a certain pair of a first communication node and a second communication node. Providing a plurality of shared transmit-/receive aerials may make it possible to further improve the signal processing capacity of the system because different signals may be transmitted simultaneously on the various aerials.

Embodiments of the communication network are described that apply to the interface device, the aircraft, the method for operating an interface for a communication network, and the use of an interface device or of a communication network in an aircraft.

The communication network may comprise an accommodation device in which the plurality of first communication nodes may be accommodated. In other words the first communication nodes may be accommodated locally at a special position in a shared arrangement, in particular directly adjacent to the interface device to create a central control centre in which the control devices for controlling the distributed receive devices are provided. The accommodation device may be an electronics rack. Accordingly, the first communication nodes may be electronics devices which may simply be plugged into, or removed from, the electronics rack.

At least one of the plurality of first communication nodes may comprise a control device for controlling the allocated second communication node. In other words the control devices which control the second communication nodes, arranged so as to be decentralised, nay be arranged centrally in the vicinity of the interface device. However, as an alternative or in addition, controlling the first communication nodes by the second communication nodes may also be possible.

At least one of the first communication nodes may be equipped as a wireless local area network (WLAN) device, a mobile radio device (in particular a GSM radio device), an in-flight cabin entertainment device (for example digital television), a person monitoring device (for example cameras for monitoring the passenger compartment, etc.), a freight monitoring device (which for example may make it possible for a freight provider to determine from the ground where a particular item of freight is located at any given time), a security monitoring device, or a multimedia device (for example an in-flight cabin entertainment system).

Each of the second communication nodes may comprise a transmit-/receive aerial for wireless communication with the transmit-/receive aerial of the interface device. Thus, the second communication nodes may comprise a separately allocated transmit-/receive aerial arranged so as to be decentralised, which may communicate with the central shared transmit-/receive aerial of the interface device wirelessly by way of the exchange of electromagnetic radiation.

The system may be used with the interface device, the communication network, the aircraft, and the method for operating an interface for a communication network.

The interface device and/or the plurality of first communication nodes may be arranged in the fuselage of an aircraft.

At least part of the plurality of second communication nodes may be arranged in a cockpit, in a passenger compartment, in a cargo hold, in a galley or in a sanitation region of the aircraft.

The system may be implemented both by a computer program, in other words software, and by one or several special electrical circuits, in other words hardware, or in any desired hybrid form, in other words partly by software components and partly by hardware components.

BRIEF DESCRIPTION OF THE DRAWINGS

Examples are shown in the drawings that are explained in more detail in the detailed description.

DETAILED DESCRIPTION OF EXEMPLARY EMBODIMENTS

Figure 1:
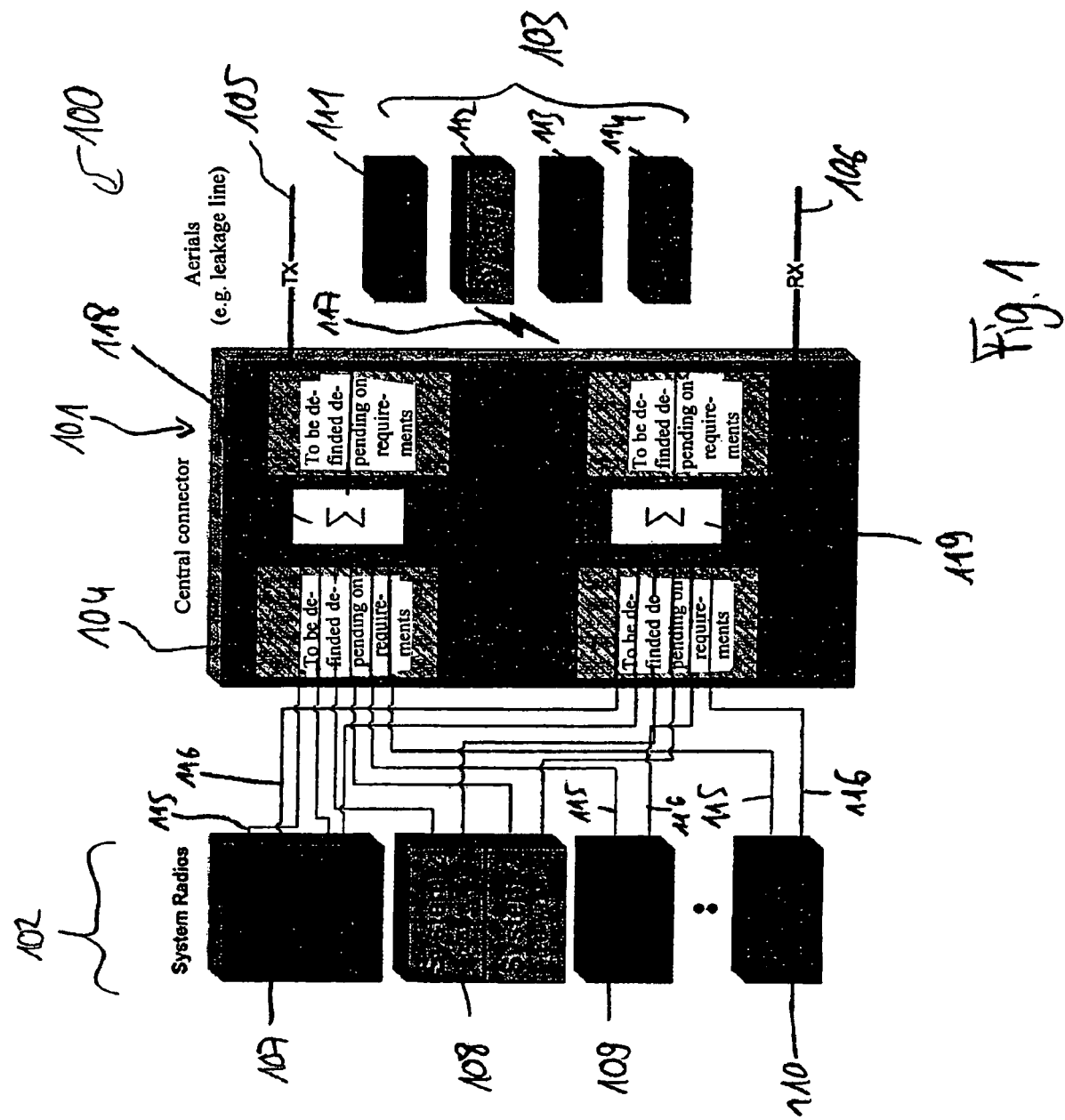
FIG. 1 illustrates an example of a communication network.

The drawings and this detailed description provide some examples of the present invention, which should not be used to limit the scope of the claims that issue.

Identical or similar components in different drawings may have the same reference signs to improve clarity.

The drawings illustrate the examples diagrammatical and are not drawn to scale.

Below, with reference to FIG. 1, a communication network 100 is described, which is implemented in an aircraft. The communication network 100 comprises an interface device 101, a plurality of first communication nodes 102 and a plurality of second communication nodes 103. The interface device 101 comprises a switching unit 104, a transmit aerial 105 and a receive aerial 106.

The first communication nodes 102 comprise a first control system 107 (a WLAN device), a second control system 108 (also a WLAN device), a third control system 109 (a GSM device) and an $n^{th}$ control system 110 (a digital video broadcasting, DVB, system, in other words a standard for transmitting digital television).

A first receive system 111 is allocated, so as to be decentralised, to the first centrally provided control system 107, in other words located at any desired position in an aircraft. A distributed second receive system 112 is allocated, at any desired position in the aircraft, to the central second control system 108. A third receive system 113 is allocated, at any desired position in the aircraft, to the third control system 109. An $n^{th}$ receive system 114 is allocated, at any desired position in the aircraft, to the $n^{th}$ control system 110. A respective control system 107 to 110 is equipped for controlling the allocated receive system 111 to 114.

The switching unit 104 is coupled, so as to be able to communicate, to each of the first communication nodes 102 by way of transmit lines 115 and/or receive lines 116. Furthermore, the switching unit 104 is equipped for transmitting a communication message between one of the first communication nodes 102 and a second communication node 103, which is unambiguously allocated to said first communication node 102. Furthermore, the switching unit 104 is coupled to the transmit aerial 105 and to the receive aerial 106 for wireless communication with each of the second communication nodes 103 by way of the shared transmit aerial 105 and/or receive aerial 106 provided for communicating with each of the second communication nodes. Such wireless communication 117 takes place between the transmit-/receive aerials 105, 106 and the transmit-/receive aerials (not shown) provided in each of the systems 111 to 114.

For wire-bound communication with each of the first communication nodes 102, the switching unit 104 comprises the transmit lines 115, 116. Each of the transmit lines 115 is equipped for transmitting a message to be transmitted by one of the first communication nodes 102 and each of the receive connections 116 is equipped for transmitting a message to be sent to one of the first communication nodes 102.

The switching unit 104 comprises a first signal processing unit 118, which is coupled to the plurality of transmit connections 115 and which is equipped for processing signals to be transmitted by the transmit aerial 105, which signals can be conveyed to the first signal processing unit 118 by at least one of the transmit connections 115. Furthermore, the switching unit 104 comprises a second signal processing unit 119, which is coupled to the plurality of receive connections 116 and which is equipped for processing signals transmitted by the receive aerial 106, which signals can be conveyed to at least one receive connection 116 by the second signal processing unit 119.

The first to the $n^{th}$ control systems 107 to 110 are electronics slide-in devices, which are slid into an electronics rack (not shown). The first to the $n^{th}$ receive systems 111 to 114 are provided, so as to be decentralised, at various positions in an aircraft, for example in a passenger compartment, a cargo hold, a galley, a sanitation region or in a cockpit. The individual services can thus be provided so as to be decentralised and can be controlled at a central position at which the system radios 102 and the central connector 101 are arranged. The interface device 101 and the first communication node 102 are arranged in the fuselage and the second communication nodes 103 are arranged in various decentralised locations in the aircraft (cockpit, passenger compartment, cargo hold, galley, sanitation region).

As shown in FIG. 1, the central connector (mixer) 101 comprises an interface between all connected systems 107 to 110 and/or 111 to 114. Each system 107 to 110 comprises one or several transmit- and receive units (shown as system radios), which are separately coupled to the central mixer 101. The two aerials 105, 106 are connected at the output of the central mixer 101, wherein all the communications with the second communication node 103 are established by way of said aerials 105, 106.

WLAN applications require a transmit aerial 105 which is provided exclusively for transmitting; and a receive aerial 106, which is exclusively equipped for receiving radio signals. In this way shared activation with so-called WLAN radio signals and simultaneous utilisation of all channels available independently without frequency overlap becomes possible, because on the receive side, overdrive of low noise amplifiers (LNAs) of the WLAN access points that transmit in an uncoordinated way is prevented. Additional radio signals (for example based on GSM telephony) can be mixed onto the TX side of the universal central distribution system 100, and can be transmitted and received by way of this branch In the central mixer 101 the various signals (frequency, level, modulation) are correctly cumulated and/or separated in the receiver branch Depending on the connected system, to this effect further components (filters, insulators, amplifiers etc.) can be implemented, which components make the necessary adjustments (level, impedance).

The architecture of the communication network 100 provides the advantage of a shared aerial infrastructure (for example leakage line) to supply an entire region with a central feed-in point, which feed-in point according to the embodiment described is provided in the fuselage. Furthermore, integration of several system radios in a housing is possible, which leads to savings in weight and space.

Separation of the transmit and receive branches creates the prerequisite for using all the channels for each integrated system (standard); in other words in the case of WLAN the use of all three independent channels in the ISN band of an aerial.

Figure 2:
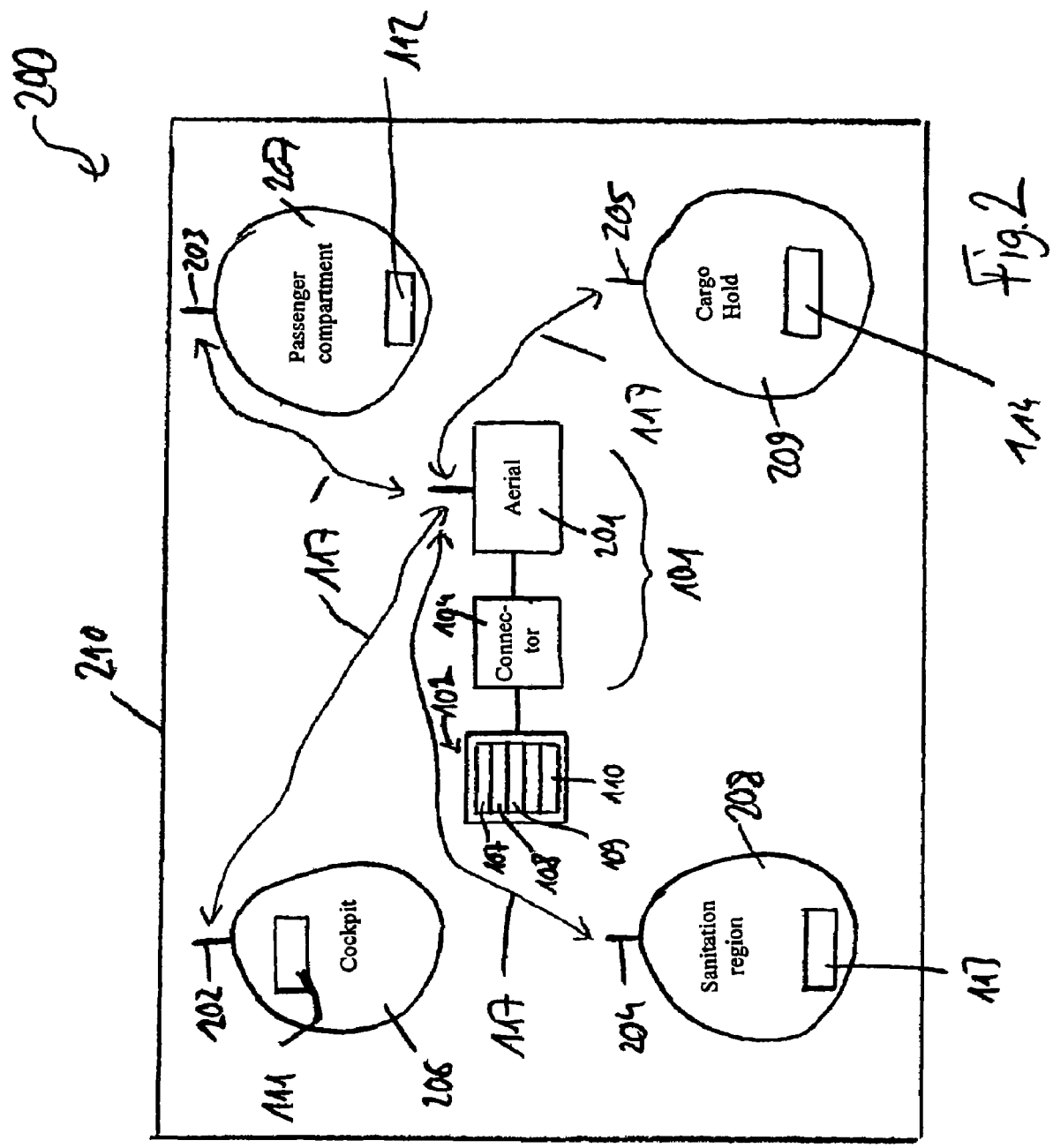
FIG. 2 illustrates a communication network according to another example.

Furthermore, with reference to FIG. 2, another example of a communication network 200 is described. The example illustrated in FIG. 2 differs from the example illustrated FIG. 1 in that instead of a separate transmit aerial 105 and a separate receive aerial 106, according to FIG. 2 only a single central transmit-/receive aerial 201 is provided in the interface device 101, which central transmit-/receive aerial carries out wireless communication 117 with local transmit-/receive aerials 202 to 205 at various locations in an aircraft 210. The individual receive systems 111 to 114 are arranged, so as to be decentralised, in a cockpit 206, a passenger compartment 207, a sanitation region 208, and/or in a cargo hold 209 in the aircraft 210, wherein the local transmit-/receive aerials 202 to 205 are coupled, so as to be able to communicate, to the central transmit-/receive aerial 201.

It should be noted that the term "comprising" does not exclude other elements or steps and the "a" or "an" does not exclude a plurality. Also elements described in association with different embodiments may be combined. It should also

LIST OF REFERENCE CHARACTERS

100 Communication network
101 Interface device
102 First communication node
103 Second communication node
104 Switching unit
105 Transmit aerial
106 Receive aerial
107 First control system
108 Second control system
109 Third control system
110 $N^{th}$ control system
111 First receive system
112 Second receive system
113 Third receive system
114 $N^{th}$ receive system
115 Transmit line
116 Receive line
117 Wireless communication
118 First signal processing unit
119 Second signal processing unit
200 Communication network
201 Central transmit-/receive aerial
202 Local transmit-/receive aerial
203 Local transmit-/receive aerial
204 Local transmit-/receive aerial
205 Local transmit-/receive aerial
206 Cockpit
207 Passenger compartment
208 Sanitation region
209 Cargo hold
210 Aircraft

What is claimed:

1. An interface device for a communication network within an aircraft having a plurality of first communication nodes arranged in a fuselage of the aircraft and a plurality of second communication nodes disposed in the fuselage of the aircraft, the interface device comprising:
a switching unit; and
a transmit-/receive aerial disposed in the fuselage of the aircraft, wherein the transmit-/receive aerial is divided into a transmit aerial for wireless transmission of signals to the plurality of the second communication nodes and into a receive aerial, provided separately from the transmit aerial, for wireless receiving of signals from the plurality of second communication nodes;
wherein the switching unit is capable of coupling to each of the plurality of the first communication nodes and to each of the plurality of the second communication nodes, and is configured for transmitting a communication message between one of the plurality of the first communication nodes and one of the plurality of second communication nodes, allocated to the one of the plurality of first communication nodes; wherein the switching unit is coupled to the transmit aerial and the receive aerial for wireless communication with each of the plurality of the second communication nodes using the transmit-/receive aerial shared for communicating with each of the plurality of the second communication nodes, and the transmit aerial and the receive aerial are capable of communicating simultaneously with each of the plurality of the second communication nodes.

2. The interface device of claim 1, wherein the switching unit is equipped for wire-bound communication with each of the first communication nodes.

3. The interface device of claim 1, wherein the switching unit comprises: a plurality of transmit connections; and a plurality of receive connections; wherein in each case one of the transmit connections and in each case one of the receive connections are capable of coupling to one of the first communication nodes; wherein each of the transmit connectors is equipped for transmitting a communication message to be sent by one of the first communication nodes; and wherein each of the receive connections is equipped for transmitting a communication message to be sent to one of the first communication nodes.

4. The interface device of claim 3, wherein the switching unit comprises: a first signal processing unit, wherein the first signal processing unit is coupled to the plurality of transmit connections; and wherein the first signal processing unit is equipped for processing signals to be sent by the transmit-/receive aerial, and the signals are capable of being conveyed to the first signal processing unit by at least one of the transmit connections.

5. The interface device of claim 3, wherein the switching unit comprises: a second signal processing unit, wherein the second signal processing unit is coupled to the plurality of receive connections; and wherein the second signal processing unit is equipped for processing signals received by the transmit-/receive aerial, which signals are conveyable to at least one receive connection by the second signal processing unit.

6. The interface device of claim 1, further comprising: a plurality of transmit-/receive aerials, each of which is provided for communication with each of the second communication nodes in a shared arrangement.

7. A communication network, comprising: an interface device of claim 1; a plurality of first communication nodes; and a plurality of second communication nodes; wherein one of the second communication nodes is allocated to each of the first communication nodes such that allocation of the second communication nodes is unambiguous; wherein the switching unit is coupled, so as to be able to communicate, to each of the first communication nodes and to each of the second communication nodes, and is set up for transmitting a communication message between one of the first communication nodes and a second communication node, which is unambiguously allocated to said first communication node by way of the transmit-/receive aerial that is shared for communicating with each of the second communication nodes.

8. The communication network of claim 7, further comprising: an accommodation device in which the plurality of first communication nodes is capable of being accommodated by the accommodation device.

9. The communication network of claim 8, wherein the accommodation device is an electronics rack.

10. The communication network of claim 7, wherein at least one of the plurality of first communication nodes comprises a control device for controlling the allocated second communication node.

11. The communication network of claim 7, wherein at least one of the first communication nodes is configured as a WLAN device; a mobile radio device; an in-flight cabin entertainment device; a monitoring device; or a freight monitoring device.

12. The communication network of claim 7, wherein each of the second communication nodes comprises a transmit-/receive aerial for wireless communication with the transmit-/receive aerial of the interface device.

13. An aircraft, comprising an interface device of claim 1 or a communication network of claim 7.

14. A method for operating an interface for a communication network in an aircraft comprising: arranging a plurality of first communication nodes in the aircraft and arranging a plurality of second communication nodes in a fuselage of the aircraft including a cockpit, a passenger compartment, a cargo hold, a galley, a sanitation region, or a combination thereof, the method comprising:

coupling a switching unit of the interface, so as to be able to communicate, to each of the first communication nodes and to each of the second communication nodes;

setting up the switching unit for transmitting a communication message between one of the first communication nodes and a second communication node, which is allocated to said first communication node; and coupling the switching unit to a transmit-/receive aerial in the fuselage of the aircraft for wireless communication with each of the second communication nodes using the transmit-/receive aerial that is shared for communicating with each of the second communication nodes; wherein the transmit-/receive aerial is divided into a transmit aerial and a receive aerial, provided separately, the transmit aerial is for wireless transmission of signals to the plurality of the second communication nodes, and the receive aerial is for wireless receiving of signals from the plurality of the second communication nodes, and the transmit aerial and the receive aerial are capable of communicating simultaneously with each of the plurality of the second communication nodes.

* * * * *